United States Patent
Randel

(10) Patent No.: US 6,549,203 B2
(45) Date of Patent: Apr. 15, 2003

(54) LIGHTING AND SHADOWING METHODS AND ARRANGEMENTS FOR USE IN COMPUTER GRAPHIC SIMULATIONS

(75) Inventor: Mark R. Randel, Flower Mound, TX (US)

(73) Assignee: Terminal Reality, Inc., Lewisville, TX (US)

( * ) Notice: Subject to any disclaimer, the term of this patent is extended or adjusted under 35 U.S.C. 154(b) by 0 days.

(21) Appl. No.: 10/123,978

(22) Filed: Apr. 16, 2002

(65) Prior Publication Data
US 2002/0158872 A1 Oct. 31, 2002

Related U.S. Application Data

(63) Continuation-in-part of application No. 09/268,078, filed on Mar. 12, 1999, now Pat. No. 6,362,822.

(51) Int. Cl.[7] .............................................. G06T 17/00
(52) U.S. Cl. ...................................................... 345/426
(58) Field of Search ................................ 345/418, 419, 345/425, 426, 427

(56) References Cited

U.S. PATENT DOCUMENTS 5,704,024 A * 12/1997 Voorhies et al. ............ 345/426
6,018,350 A * 1/2000 Lee et al. .................... 345/422
6,097,394 A * 8/2000 Levoy et al. ................ 345/419
6,195,099 B1 * 2/2001 Gardiner ...................... 345/426
6,203,431 B1 * 3/2001 Miyamoto et al. .......... 345/419
6,362,822 B1 * 3/2002 Randel ........................ 345/426

* cited by examiner

Primary Examiner—Cliff N. Vo
(74) Attorney, Agent, or Firm—Jenkens & Gilchrist, P.C.

(57) ABSTRACT

The effects of lighting and resulting shadows within a computer simulated three-dimensional scene are modeled by rendering light depth data and a light color data for each of the light sources. The light depth data is compared to a camera depth data to determine if a point within the scene is lighted by the various light sources. Accumulated light data is produced by combining those portions of the light color images determined to be lighting the scene and stored in the frame buffer. The resulting accumulated light data is then combined with a camera color image to produce a lighted camera image that can be further processed and eventually displayed on a computer display screen. The light color image can be static or dynamic. The various images and manipulations can include individual pixel data values, multiple-pixel values, polygon values, texture maps, and the like.

20 Claims, 11 Drawing Sheets

LIGHTING AND SHADOWING METHODS AND ARRANGEMENTS FOR USE IN COMPUTER GRAPHIC SIMULATIONS

RELATED APPLICATION(S)

This application is a Continuation-in-Part of U.S. application Ser. No. 09/268,078 filed on Mar. 12, 1999, now U.S. Pat. No. 6,362,822.

TECHNICAL FIELD OF THE INVENTION

The present invention relates to computer graphics and, more particularly, to improved methods and arrangements for use in rendering lighting and shadows in computer graphic simulations, such as, for example, interactive computer graphics simulations of multi-dimensional objects.

BACKGROUND OF THE INVENTION

Computer generated graphics are becoming more popular in everyday computing especially given recent advances in affordable computer hardware and software. This trend is expected to continue in the foreseeable future. By way of example, interactive computer generated graphical images are becoming increasingly detailed and more realistic due to increased processing capabilities in personal computers (PCs). No where is this more evident than in the computer gaming arena, wherein virtual three-dimensional (3D) worlds are created in software and interactively explored by the computer's user.

As with the real World, these virtual 3D worlds consist of a plurality of 3D objects. These 3D objects are typically modeled by one or more polygons. In the computer, depending upon the orientation of the scene being viewed, some of these polygons correspond to individual pixels that are displayed on the computer's display screen. Within the computer, these pixels are represented by data that can be manipulated and stored in at least one data base. For example, once the arrangement of these 3D objects with respect to one another has been determined for a particular viewpoint, the rendered scene of the 3D world is projected onto a two-dimensional (2D) frame that can be displayed to the user. The frame is typically a data base that contains pixel color information with regard to the display screen.

A sense of motion within this virtual 3D world is provided by incrementally altering the arrangement of these 3D objects and quickly re-displaying the transformed frame. Typically, a frame rate of at least about twenty-five (25) frames-per-second (fps) is desired to convey a sense of motion.

Rendering such interactive 3D worlds, however, typically requires that millions of calculations be conducted between frames (i.e., in "real time"). Since there is a limit to the amount of processing that a computer can provide between frames, simplifications or other compromises often need to be made in modeling a 3D world. Additionally, advanced algorithms are implemented in either hardware and/or software to further streamline the processing of the resulting 3D scene and 2D images. Regardless of how the rendering computations are completed, the goal remains the same, namely, to provide a realistic, interactive virtual 3D world to the user.

One of the unfortunate compromises made in the past, has been in the area of lighting and, more particularly, in the area of rendering shadows cast by lighted 3D objects. Many shadow rendering processes have been considered to be too compute intensive for most lower-end computer applications, and as such shadow rendering is often ignored or otherwise greatly simplified. Several advanced and simplified shadow rendering algorithms and other graphical algorithms and techniques are described by James D. Foley, et al. in *Computer Graphics: Principles and Practice*, second edition, 1997 (ISBN 0-201-84840-6), published by Addison-Wesley Publishing Company, Inc. This text is expressly incorporated herein, by reference, in its entirety and for all purposes.

By way of a particular example, Foley et al. describe a promising two-pass object-precision shadow algorithm in Section 16.4.2 of the text. This two-pass shadow algorithm, developed by Atherton, Weiler and Greenberg, essentially determines which portions on a 3D object's surfaces are visible from the perspective of a light source (i.e., from the light source's view point). This requires converting the data for the 3D object, as represented in a data base, from a modeled world coordinate to a light source coordinate and then determining which portions of the various polygons are visible surfaces with respect to the light source, for example, using a hidden-surface removal algorithm. Since these visible portions are illuminated (i.e., lit) by the light source, the remaining portions (i.e., the hidden-surfaces) are darkened as being shaded from the light. The resulting data is then transformed back to modeling world coordinates and merged with the original object data base. This creates a viewpoint-independent merged data base that can be used to determine the shadows on the various 3D objects from any other viewpoint. This is the first step of the two-step shadow algorithm.

In the second step of the two-pass shadow algorithm, the data in the merged data base is then converted from the modeled world space to a corresponding screen (or camera) viewpoint. Then, a hidden-surface algorithm is used to determine which portions of the various polygons are visible surfaces with respect to the camera. These visible portions are identified as being visible to the camera and as being either not-darkened (i.e., lit) or darkened (i.e., in a shadow). A polygon scan-conversion algorithm is then used to render the resulting 2D image.

One of the drawbacks to this type of shadow algorithm is that unrealistic shadowing can occur in scenes having multiple light sources. Foley et al. for example, one page 747 of their text, teach that multiple light sources are handled by re-processing the merged data base for each new light source. Thus, for example, assume that a portion of a polygon which is visible from the camera viewpoint has been darkened because it is shaded from a first light source. This is information is recorded in the merged data base. Then, this merged data base is used as the starting point for a similar process for the second light source's viewpoint determination. As part of this second light source's viewpoint determination, additional darkening can occur to portions of the scene that are also shaded from the second light source. As a result, there is a potential for a portion of the scene to be darkened twice. In scenes having multiple light sources, including ambient light, this additive darkening of portions, and in particular, pixels, tends to reduce the realism of the shadowing effects and can lead to awkward shadowing cross-talk, wherein a shadow is made overly dark and has unrealistic transitions. This is especially true for applications using a "stencil buffer" technique for shadowing.

Additionally, when there are several light sources, for example, four or more, the transformation process associated with converting between the camera, world, and light viewpoints in support of this type of two pass algorithm can prove to be too burdensome, thereby inhibiting or otherwise diminishing the effectiveness of the resulting interactive real-time graphics.

Consequently, there is need for improved shadow rendering methods and arrangements. Preferably, the improved shadow rendering methods and arrangements support real time interactive graphics on conventional PCs and the like, and allow for multiple light sources to be modeled in a more efficient and realistic manner.

SUMMARY OF THE INVENTION

The present invention overcomes the foregoing and other problems with a shadow rendering system and method for use in a graphics device wherein observer data is provided of a simulated multidimensional scene as is lighting data associated with at least one simulated light source to illuminate said scene. For the at least one light source, a comparison of at least portion of the observer data is made with at least a portion of the lighting data to determine if a model point within the scene is illuminated by the light source. If so, a portion of the light image data associated with a said model point is stored in a portion of a frame buffer of the system. Light accumulation data stored within the frame buffer is combined with the observer data to create a rendered image and the resulting image data is output to a computer screen.

BRIEF DESCRIPTION OF THE DRAWINGS

A more complete understanding of the method and arrangements of the present invention may be had by reference to the following detailed description when taken in conjunction with the accompanying drawings wherein.

DETAILED DESCRIPTION OF THE DRAWINGS

Figure 1:
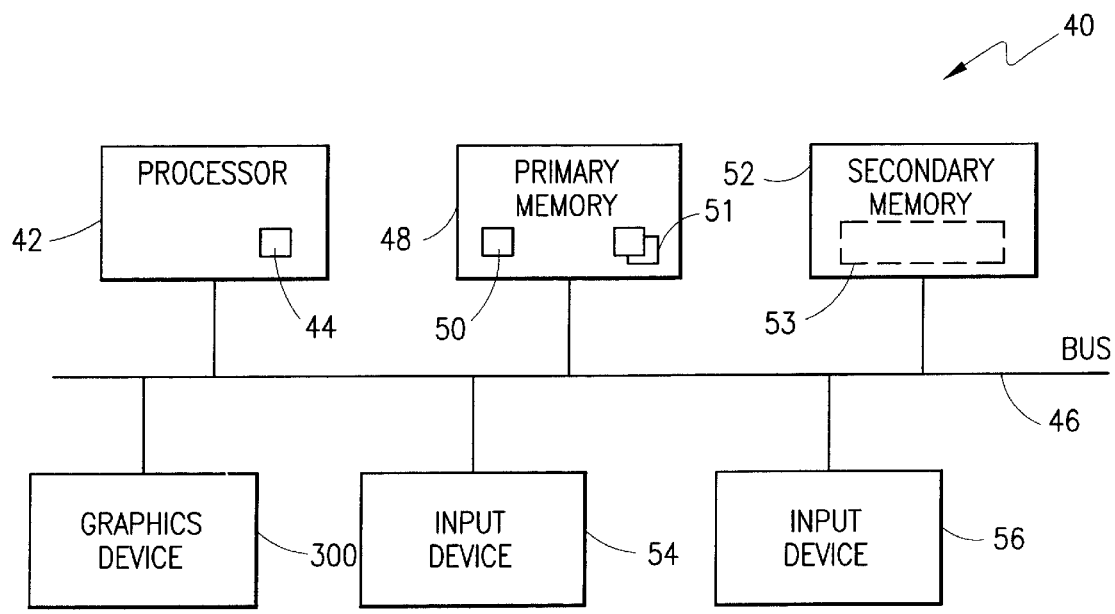
FIG. 1 is a block diagram depicting a computer system that is configured to generate and display interactive 3D graphics, in accordance with certain embodiments of the present invention.

FIG. 1 is a block diagram depicting a computer system or like device, 40, that is configured to generate and display interactive 3D graphics, in accordance with certain embodiments of the present invention. Computer system 40 includes at least one processor 42 that is configured to operate in accordance with at least one computer application 44 having computer instructions therein. Processor 42 can include at least one microprocessor or central processing unit (CPU), math co-processors, input/output processors, memory access processors, local memory cache, graphics accelerator processors, etc. A bus 46 is connected to processor 42 and configured to carry data and/or control signals thereto and therefrom. Bus 46 includes one or more buses, and can also include additional communication chip sets, interfaces, gateways, and/or networks.

A primary memory 48, including at least one frame buffer 50, is connected to bus 46 and configured to store data and to be accessed by at least processor 42 via bus 46. Primary memory 48 can also include a plurality of additional memory partitions, buffers, and/or data bases 51. Primary memory 48 typically includes random access memory (RAM) or the like. A secondary memory 52 is connected to bus 46 and configured to store data and to be accessed by at least processor 42 via bus 46. Secondary memory 52 can include additional memory and/or a data storage device, such as, for example, a hard disk drive, removable-disk drive, a CD-ROM drive, a DVD-ROM drive, a tape drive, a server, and/or the like. A removable computer-readable media 53 is shown for use with certain types of secondary memory 52. Media 53 can be, for example, an optical disc (e.g., CD, DVD, etc.), a magnetic disk, a data cartridge, a magnetic tape, or a similar medium configured to store data.

At least one user input device 54 is connected to bus 46 and configured to allow a user to input commands to processor 42 via bus 46. By way of example, input device 54 can include a keyboard, a mouse, a trackball, a game input, a joy stick, a pen and tablet, a pointing device, a touch screen, a voice recognition device, or other similar devices. At least one output device 56 is connected to bus 46 and configured to display or otherwise output data from processor 42 to the user. For example, output device 56 can include a CRT display, a flat panel display, a LCD display, a plasma display, a television, a projected display, a printer, an imager, etc.

A graphics device 300 may also be connected to the bus 46 and may perform graphics related processing either in conjunction with the other components of the computer system 40 or perform a number of graphics processing functionalities, as will be described more fully in a moment, on its own for provision to the output device 56. The graphics device 300 may comprise a graphics accelerator card, graphics modules in a console type game unit, etc.

Figure 2A:
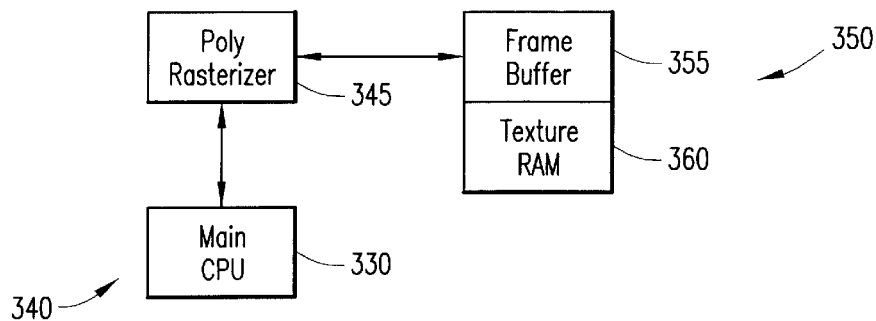
FIG. 2A is a block diagram of a graphics card used in a computer.
Figure 2B:
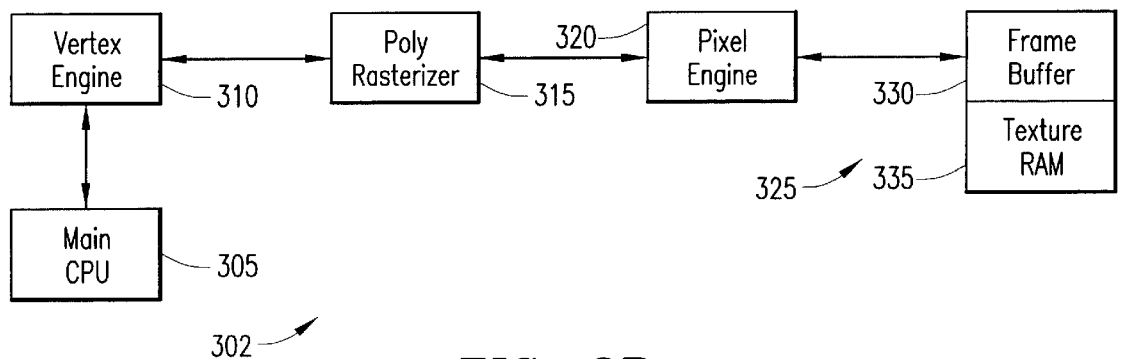
FIG. 2B is a block diagram of a graphics module used in a console-type game unit.

Referring now also to FIGS. 2A and 2B, there are illustrated the configurations of a graphics device 300 for use in a PC and a graphics module or card of a console-type game unit according to the present invention. In FIG. 2A, there is illustrated a block diagram of a graphics card 302 used in a personal or laptop computing environment. The graphics card 302 includes a main CPU 305 for performing graphics processing functionalities of the graphics card 302. A vertex engine 310 performs polygon vertex calculations enabling the rendering of polygons creating various graphic displays output by the graphics card 302. The rasterizer 315 performs raster functions for displaying the various lines of pixels displayed by the graphics card 302. The pixel engine 320 performs all calculations relating pixel conversions between camera views and light source views which will be more fully discussed in a moment. The graphics card memory 325 comprises a 32 Mb memory including a frame buffer 330 and a texture memory 335. The frame buffer 330 may be further subdivided into a number of additional buffers which collectively form the frame buffer.

Referring now to FIG. 2B, there is illustrated a graphics module 340 which would be found with a console-type game unit. The main difference between graphics devices 300 in FIGS. 2B and 2A are that the graphics module 340 in FIG. 2B does not include the vertex engine 310 or the pixel engine 220. Instead, all calculations relating to polygon vertexes and pixel conversions are performed in software by the main CPU 330. A poly rasterizer 345 perform raster functions similar to those performed by the rasterizer 315 described in FIG. 2A. Likewise, a 4 Mb graphics memory 350 includes a frame buffer 355 consisting of one or more frame buffers and a texture RAM 360 for storing object textures related to graphical items displayed.

Figure 3:
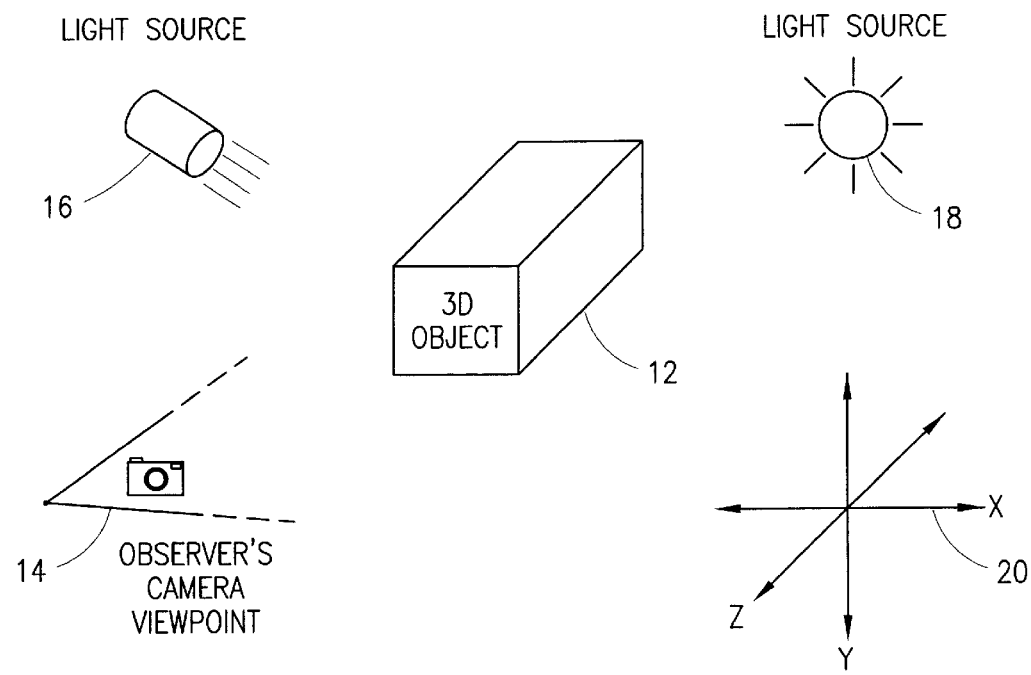
FIG. 3 is a block diagram depicting an exemplary 3D graphics scene that can be rendered by a computer system as in FIG. 1, in accordance with certain embodiments of the present invention.

FIG. 3 is a block diagram depicting an exemplary 3D graphics scene 10 that can be rendered by computer system 40 of FIG. 1. Scene 10 includes at least one 3D object 12 that is arranged within a defined space (e.g., background or backdrop). 3D object 12 is represented by spacial data, for example, a plurality of polygons. When viewed from camera perspective 14, certain portions of scene 10 will be visible within the field-of-view (fov) associated with the camera and the camera's position and orientation with respect to scene 10. Camera 14 is typically modeled as being responsive to visible light from scene 10. As such, scene 10 is illuminated, for example, by one or more light sources, such as, a first light source 16 (#1) and a second light source 18 (#2). Light source #1, in this example, is a uni-directional light source having a particular position, orientation and constrained field-of-view. Light source #2 is, in this example, a multi-directional light source having a particular position, orientation and non-constrained field-of-view. Light sources #1 and #2 are modeled as emitting one or more frequencies of visible light, at an initial intensity (color) onto scene 10.

A world space coordinate system 20, for example, having an arbitrary origin and x, y, and z coordinates extending therefrom, is employed to define the spacial relationship between 3D object 10, light sources 16 and 18, and camera 14. Known matrix algebra techniques are used to convert or transform between world space coordinate system 20 and the unique coordinates from the perspectives of light source 16, light source 18, and camera 14. Such techniques are described, for example, in the text by Foley et al.

Figure 4:
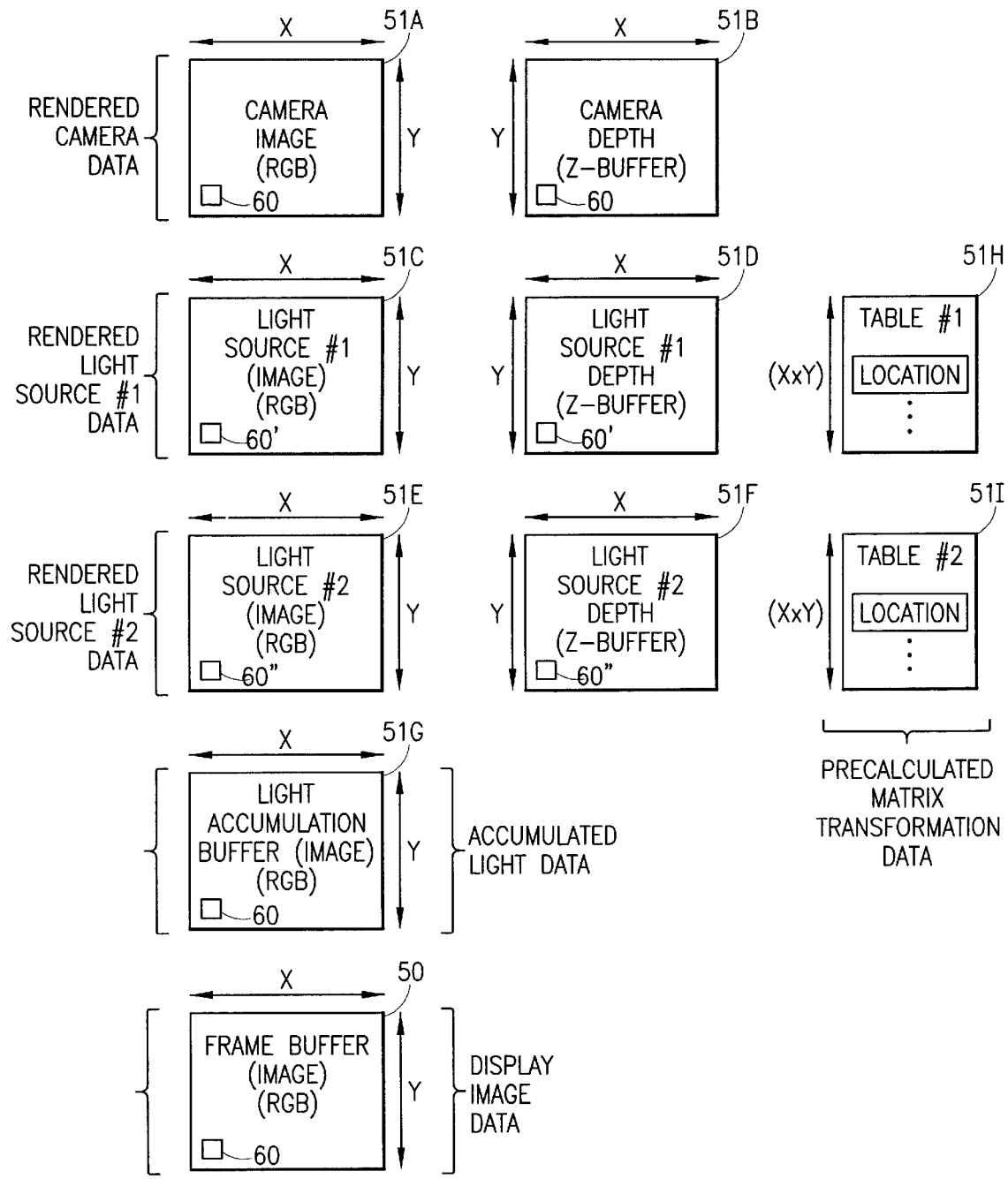
FIG. 4 is a block diagram depicting exemplary arrangements of modeling data as used to render shadows, for example, using the computer system in FIG. 1, in accordance with certain embodiments of the present invention.

With this in mind, FIG. 4 is a block diagram depicting exemplary arrangements of modeling data as used to render lighting and shadows, in accordance with certain embodiments of the present invention. For convenience, the various rendered data in FIG. 3 is illustrated as being logically stored in a plurality of 2D matrices or data bases 50 and 51A–G, each having an X axis and a Y axis. Preferably, and in this example, the X and Y axis correspond an exemplary output device 56 having a screen that displays X by Y number of pixels when provided corresponding red-green-blue (RGB) pixel data values. Those skilled in the art will recognize that other conventions and/or arrangements can also be used for storing and manipulating the data.

For camera 14, a camera image 51A is rendered of scene 10. Camera image 51A includes RGB pixel data values from scene 10 for X by Y number of pixels (or pixel groups). An exemplary pixel 60 having camera coordinates $SP_X$ and $SP_Y$ is depicted. Associated with camera image 51A is camera depth 51B. Camera depth 51B is a Z-buffer containing depth information for each of the X by Y number of pixels in camera image 51A. The depth image is used during rendering to correctly determine the ordering of 3D objects within scene 10, from the camera's perspective. The use of Z-buffers is well known, for example, see Foley et al.

For light source #1, a light image 51C is rendered of scene 10. Light image 51C includes RGB pixel data values for the light emitted, for X by Y number of pixels. For example, the data in light image 51C can represent the intensity, color, and/or pattern of light emitted by light source #1. An exemplary pixel 60', which corresponds to pixel 60 in camera image 51A, is depicted following transformation as having light source #1 coordinates $L_1P_x$ and $L_1P_y$. Associated with light image 51C is light depth 51D. Light depth 51D is a Z-buffer containing depth information for each of the X by Y number of pixels (or groups of pixels) in light image 51C. The depth image is used during rendering to correctly determine the ordering of 3D objects within scene 10, from light source #1's perspective.

Similarly, for light source #2, a light image 51E is rendered of scene 10. Light image 51E includes RGB pixel data values for the light emitted, for X by Y number of pixels (or groups of pixels). For example, the data in light image 51E can represent the intensity, color, and/or pattern of light emitted by light source #2. An exemplary pixel 60", which corresponds to pixel 60 in camera image 51A, is depicted following transformation as having light source #2 coordinates $L_2P_x$ and $L_2P_y$. Associated with light image 51E is light depth 51F. Light depth 51F is a Z-buffer containing depth information for each of the X by Y number of pixels in light image 51E. The depth image is used during rendering to correctly determine the ordering of 3D objects within scene 10, from light source #2's perspective.

A light accumulation buffer 51G is also depicted as having pixel data values for X by Y number of pixels (or groups of pixels), as in camera image 51A and camera depth 51B. Light accumulation buffer 51G includes RGB pixel data for the accumulated light falling on a pixel (or groups of pixels) from light sources #1 and #2. As discussed below, by using light accumulation buffer 51G, a more realistic shadow rendering can occur, because pixels are accumulatively lighted, rather than accumulatively darkened as in past interactive real time shadow rendering algorithms.

Frame buffer 50 is also depicted as having pixel data values for X by Y number of pixels, as in camera image 51A, camera depth 51B, and light accumulation buffer 51G. Frame buffer 50 includes RGB data of the final rendered 2D image of scene 10. The data in frame buffer 50 is provided to output device 56 for display to the user. Those skilled in the art will recognize that a plurality of frame buffers can be employed to allow for additional buffering of frames.

A first transformation table (#1) 51H is also depicted in FIG. 4. Transformation table #1, is used, in accordance with certain embodiments of the invention to provide for rapid transformation of pixels between camera coordinates and light source #1 coordinates. Transformation table #1 includes X times Y number of entries (locations), preferably arranged to directly corresponding to the sequential memory addresses of the pixel data values in camera image 51A. When light source #1 and camera 14 each have fixed positions with respect to one another and/or scene 10, transformation table #1 can be precalculated and populated with data using known matrix algebra relationships between the world space coordinate system 20 and the light source #1 and camera 14 perspectives. Thus, the resulting transformation table #1 can be used to quickly determine which, if any, of pixels 60' (light image) correspond to a specific pixel 60 (camera image).

Similarly a second transformation table (#2) 51I is further depicted in FIG. 3. Transformation table #2, is used, in accordance with certain embodiments of the invention to provide for rapid transformation of pixels between camera coordinates and light source #2 coordinates. Transformation table #2 includes X times Y number of entries (locations), preferably arranged to directly corresponding to the sequential memory addresses of the pixel data values in camera image 51A. When light source #2 and camera 14 each have fixed positions, transformation table #2 can be precalculated and populated with data using known matrix algebra relationships between the world space coordinate system 20 and the light source #2 and camera 14 perspectives. Thus, the resulting transformation table #1 can be used to quickly determine which, if any, of pixels 60" (light image) correspond to a specific pixel 60 (camera image).

By using transformation tables 51H–I, and precalculating the data therein, a substantial amount of processing time is saved when compared to calculating the same data "on-the-fly". This additional cost savings can be especially critical for interactive 3D graphic applications designed to operate on slower, lower-end, and/or older computer systems.

Figure 5:
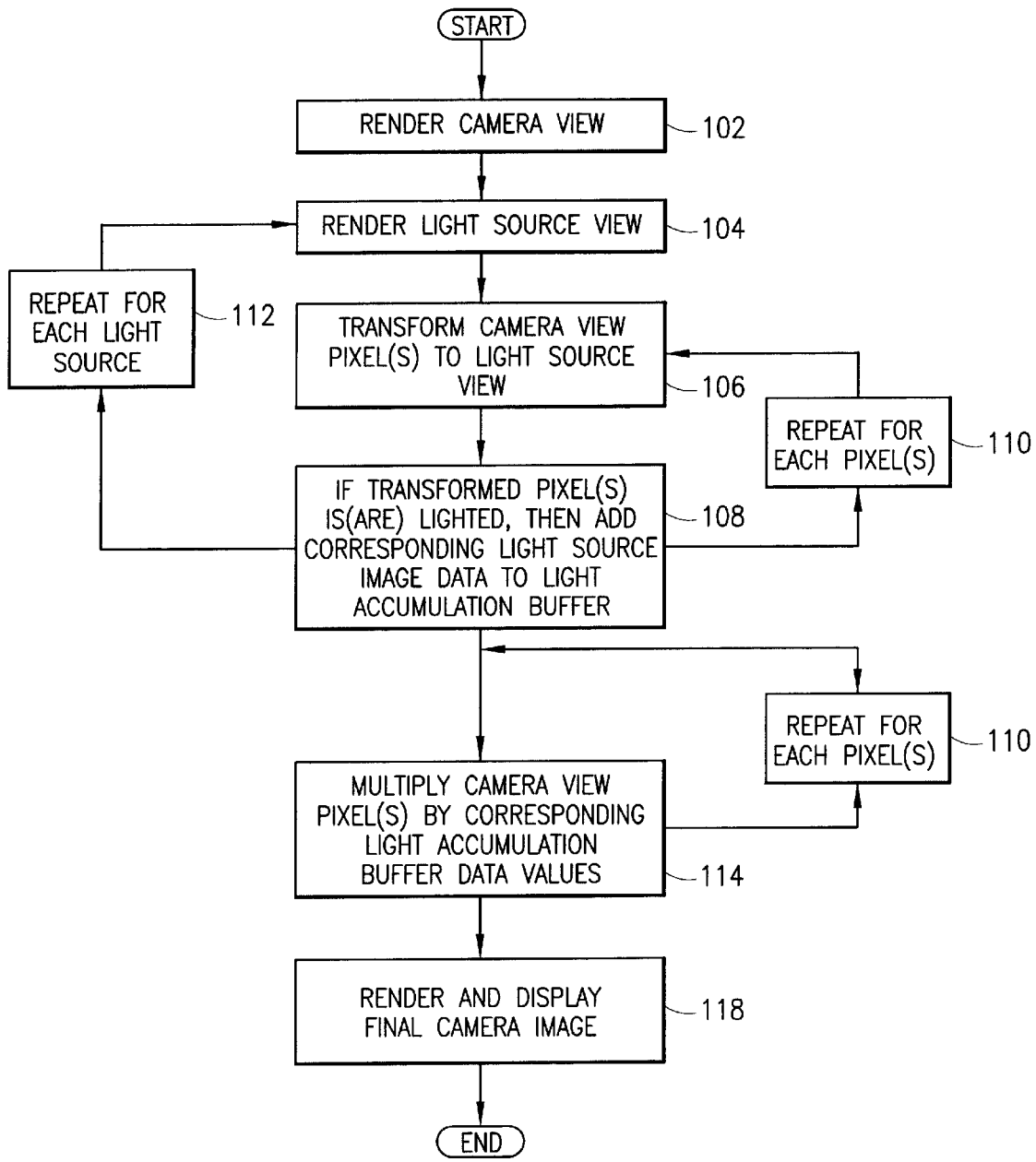
FIG. 5 is an exemplary flow-chart depicting an improved shadow rendering process, for use in a computer system, for example, as in FIG. 1, in accordance with certain embodiments of the present invention.

Reference is now made to FIG. 5, which depicts an exemplary flow-chart for an improved shadow rendering process 100, in accordance with certain embodiments of the present invention. Process 100 can be implemented, for example, in computer system 40 to render lighting and shadows for scene 10. In step 102, the camera's view is rendered using conventional methods, thereby producing camera image 51A and camera depth 51B. In step 104, the view from a light source is rendered. For example, in step 104, rendering the view from light source #1 produces light #1 image 51C and light #1 depth 51D.

Next, in step 106, a pixel 60 in camera image 51A is transformed or is otherwise used to determine a corresponding pixel 60' in light #1 image 51C (and light #1 depth 51D). The transformation calculations needed to move between coordinates in step 106 can be precalculated and stored, for example, in transformation table #1 provided that camera 14 and light source #1 are fixed with respect to scene 10. Alternatively, such transformation calculations can be conducted on-the-fly provided adequate processing capability. If either camera 14 or light source #1 are not fixed with respect to scene 10, then the transformation calculations can be conducted on-the-fly (i.e., in real-time between frames).

In step 108, if the transformed pixel identified in step 106 is illuminated by the light source, then the corresponding pixel data value in the light image is added to the light accumulation buffer 51G. For example, considering pixel 60', from the Z-value associated with pixel 60' (as identified in light #1 depth 51D) it can be determined if pixel 60' is lighted by, or shaded from, light source #1. If pixel 60' is lighted, then the corresponding (RGB) pixel data value from light #1 image 51C is added to light accumulation buffer 51G. If pixel 60' is not-lighted (i.e., is shaded), then no change is made to light accumulation buffer 51G.

Steps 106 and 108 are repeated for each of the pixels in camera image 51A, as depicted by the iteration provided by step 110. After all of the pixels in camera image 51A have been processed in steps 106–110, then, according to step 112, the process is repeated for each additional light source. Step 112 leads back to step 104, wherein the next light source view is rendered. For example, steps 104–110 can be repeated again for light source #2 (or #N light sources). This iterative process allows for each of the pixel data values within light accumulation buffer 51G to be incrementally increased in a manner that matches the cumulative light cast by the multiple light sources on each pixel.

After each of the light sources has been processed in accord with steps 104 through 112, then in step 114, a pixel data value from camera image 51A is multiplied by a corresponding pixel data value from light accumulation buffer 51G and the results are stored in camera image 51A. Step 114 is repeated for each of the pixels in camera image 51A, as depicted by iterative step 116. Then, in step 118, a resulting camera image 51A is further rendered in accord with other processes, as needed, and eventually stored in frame buffer 50 and displayed as a frame of data.

Process 100, therefore, in accordance with certain aspects of the present invention, provides realistic lighting and shadow rendering while also being computationally efficient. Process 100 can be adapted for a plurality of light sources, either fixed or moving, and for changing camera views. By way of example, the following exemplary pseudocode can be implemented in either hardware of software to provide for process 100:

RENDER EACH VIEW (PARTIAL IF THE LIGHT IS STATIONARY)
CLEAR ACCUM BUFFER
FOR EACH LIGHT SOURCE . . .
   FOR EACH PIXEL IN CAMERA IMAGE $SP_X$, $SP_Y$ . . .
      TRANSFORM EACH SP TO A LP {LIGHT PIXEL} USING EITHER:
         TRANSFORM LOOK-UP TABLE, OR
         MATRIX TRANSFORMATION CALCULATION IF $LP_Z$<LIGHT DEPTH ($LP_X$, $LP_Y$)
         THEN ACCUM ($SP_X$, $SP_Y$)+=LIGHT IMAGE ($LP_X$, $LP_Y$)
FOR EACH PIXEL IN CAMERA IMAGE . . .
   CAMERA IMAGE ($SP_X$, $SP_Y$)*=ACCUM ($SP_X$, $SP_Y$)

Figure 6:
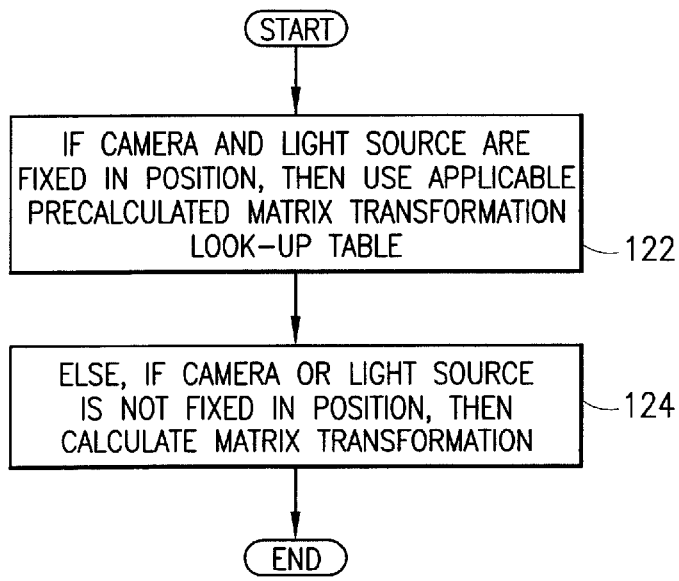
FIG. 6 is an exemplary flow-chart depicting further enhancements to the improved shadow rendering process in FIG. 4, in accordance with certain further embodiments of the present invention.

The flow-chart in FIG. 6 depicts an exemplary process 120 that can be included in step 106. Process 120 includes step 122, wherein an applicable transformation table is used to determine the transformation from camera to light source viewpoints when the camera and light source are fixed with respect to scene 10. Otherwise, in step 124, if the camera or light source are not fixed then a matrix transformation algorithm is used.

Figure 7:
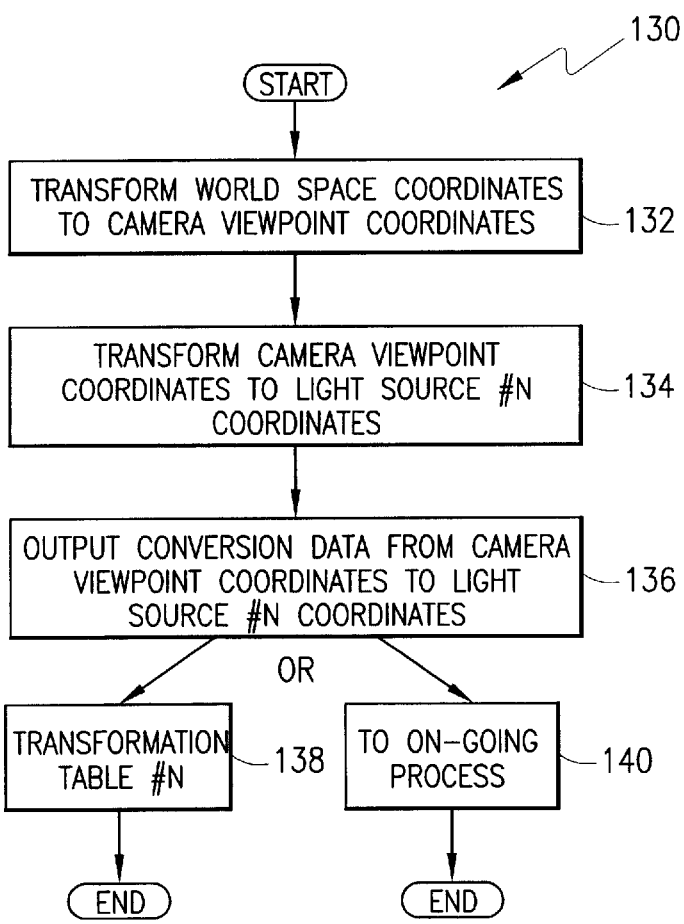
FIG. 7 is an exemplary flow-chart depicting further enhancements to the process in FIG. 5, in accordance with still further embodiments of the present invention.

An exemplary process 130 is depicted in the flow-chart of FIG. 7. Process 130 can be used to precalculate transform tables and/or included in step 124 calculate the transform on-the-fly. In step 132, a transformation is made from world space coordinate system 20 to camera coordinates. Next, in step 134, a transformation is made from camera coordinates to light source coordinates. These types of transformation processes, which are preferably completed using standard matrix algebra, are well known to those skilled in the art (see, e.g., Foley et al. text). In step 136, the resulting transformation data (camera to light source) is provided in a translation table per step 138, or returned to the shadow rendering process per step 140.

FIGS. 8A–D depict actual computer screen shots for an exemplary 3D scene of an interactive real time graphics rendering application, having an improved shadow rendering capability as described above and configured for a PC, in accordance with certain embodiments of the present invention. The application that generated the images depicted in FIGS. 8A–D is a computer-based interactive adventure game. In the exemplary scenes, the camera and two light sources are each fixed with respect to the scene. The frame in FIG. 7A is a monochrome photocopy of the colored rendered scene. The frame of FIG. 7A is shown inverted in FIG. 7B to further highlight the shadowing rendered in the scene. FIG. 7C is a essentially a "behind the scenes" view of various image buffers that are used to generate the image of FIG. 7A. FIG. 7D is the inverted image of FIG. 7C.

Figure 8A:
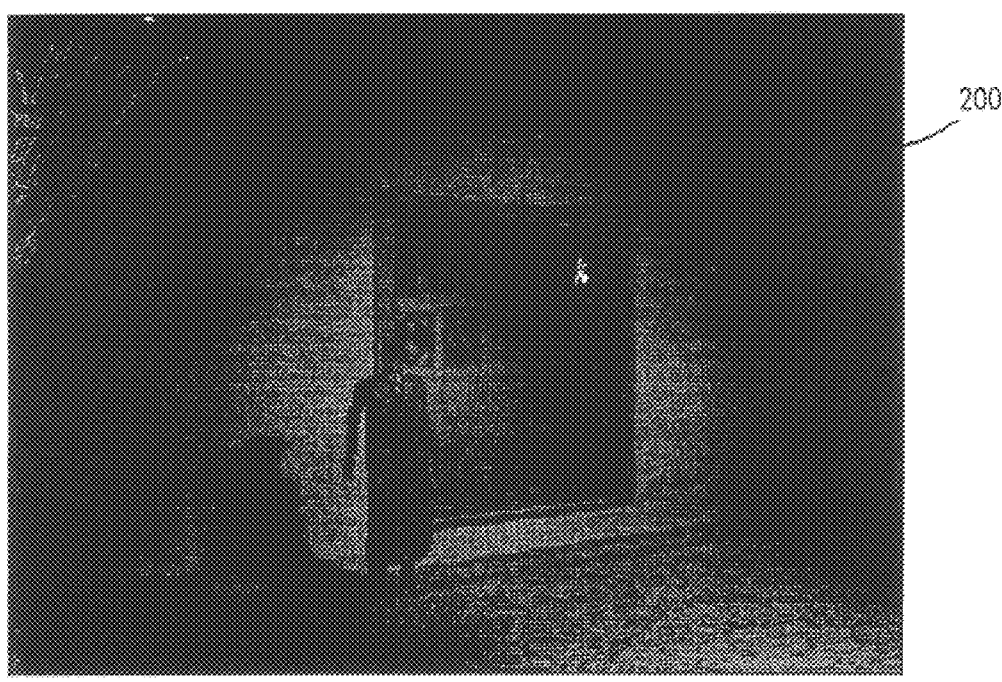
FIGS. 8A–D are photocopies of exemplary computer screen print-outs depicting an exemplary 3D scene and related rendered depth and image data from an interactive real time graphics rendering application, in accordance with certain embodiments of the present invention.
Figure 8B:
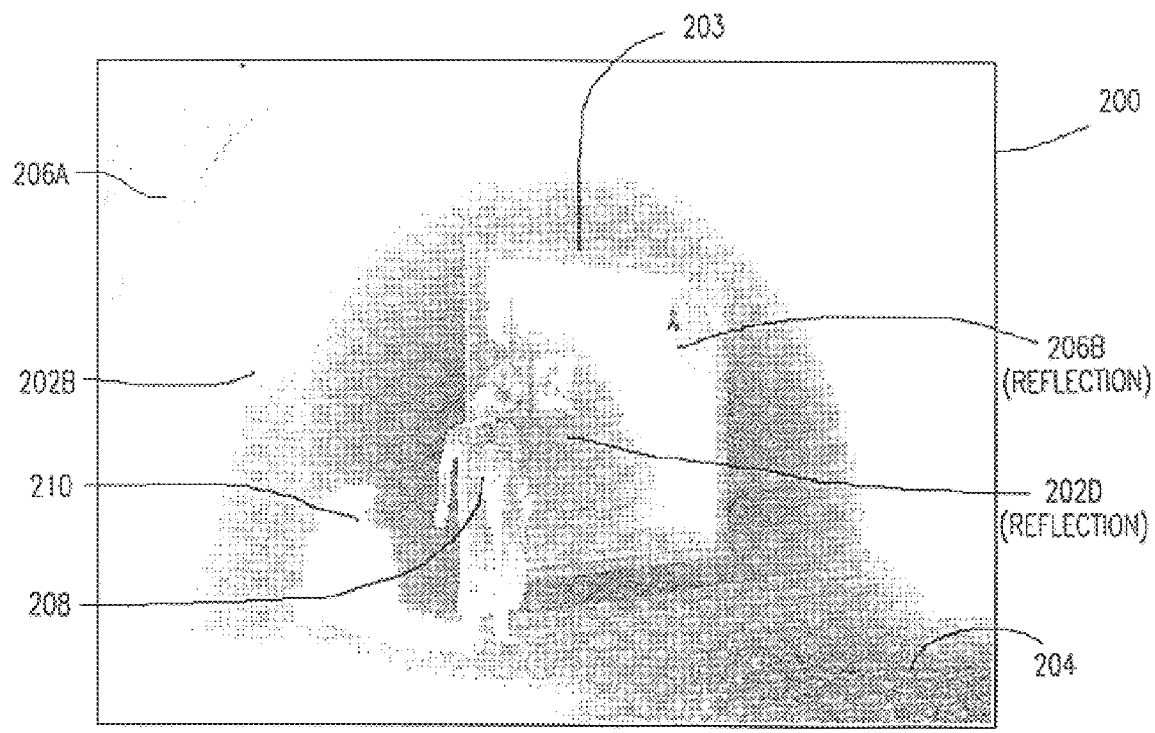

Reference will first be made to the image in FIG. 8A, with reference numerals being added to the inverted image of FIG. 8B and/or the fully lighted image of FIGS. 8C–D. In FIG. 8A there is depicted a portion of a room 200 having texture mapped walls 202A–D, floor 204, and ceiling 205. One of the walls 202B has a large mirror 203, in which is shown the reflection from another wall 202D having several pictures hanging thereon. Additional 3D objects within the room include torches 206A and 206B mounted on side walls, 202A and 202C, respectively. A man 208 is shown standing on floor 204 and in front of the mirrored wall 202B. Light is being reflected onto a portion of the mirrored wall 202B, the floor 204, the man 208, and on the wall 202D having pictures hanging thereon. The man 208 casts a shadow 210 onto a portion of the floor 204 and the mirrored wall 202B.

Figure 8C:
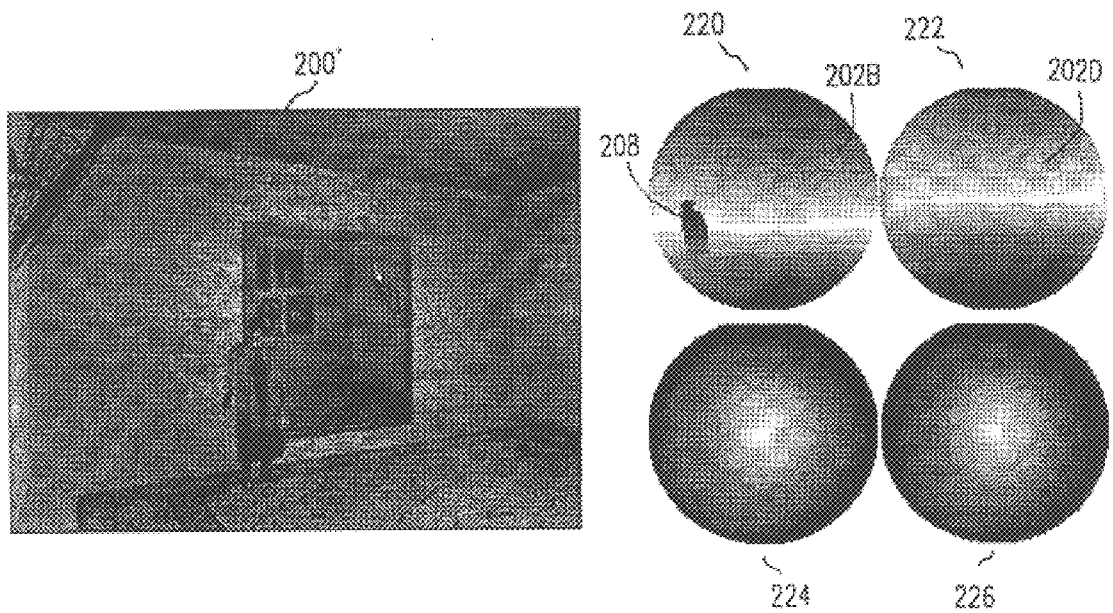
Figure 8D:
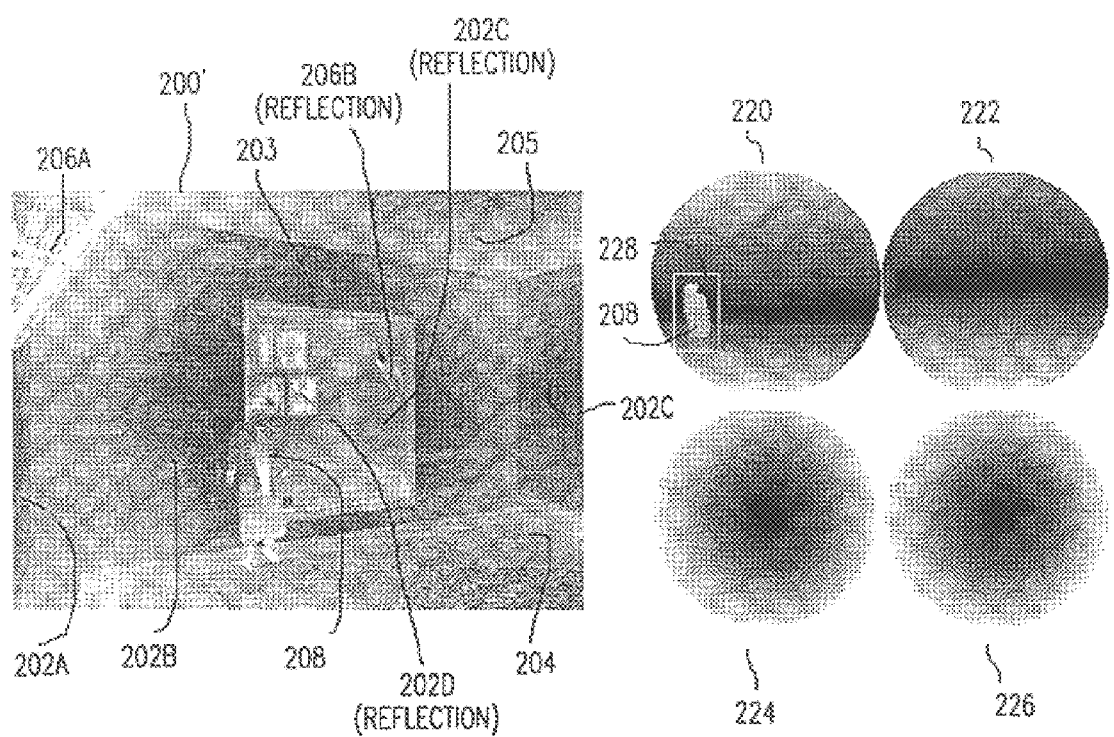

The frame in FIG. 8A, and in particular, the lighting rendered in the scene is demonstrated by the additional images in FIG. 8C. Room 200' is depicted in full light in FIG. 7C. From this image of room 200', one can understand the configuration of the modeled 3D world. Refer to the inverted image of FIG. 8D, as required, to identify a specific reference. FIG. 8C also includes four other images that are used to render the lighting and shadows in room 200'.

There are two light sources that are not visible within room 200'. These light sources are used to simulate the light emitted by simulated torches 206A and 206B. These light sources, which are not shown in FIG. 8C, are directional light sources having fixed positions with respect to room 200. Image 220 represents the light depth data for the first light, which has a circular field of view (or aperture) and is positioned to shine light on a portion of floor 204 and mirrored wall 202B. The information depicted in image 220 corresponds to depth, for example, as stored in a Z-buffer associated with this particular light source. Within depth image 220, as depicted in FIG. 8C, the closer a pixel is to the light source, the darker its image. Thus, for example, the man 208 in FIG. 8C is closest to the light source and as such is rendered the darkest shade. Conversely, the interface (corner) of mirrored wall 202B and floor 204 is the farthest away from the light source and as such is rendered the lightest shade. This is just one convention, obviously the convention could be reversed in other systems. Note, that the image 220 in FIG. 8D is inverted and thus so to is the convention.

Also associated with the first light source is a light image 224. In this example, light image 224 includes a graduated pattern of intensity that is highest near the center and lowest near the edges. In this example, light image 224 is essentially a light filter based on a cosine function. It is intended, however, that the RGB pixel data values in a light image can include any pattern of RGB data, including static and dynamically changing patterns. For example, in accordance with certain embodiments of the present invention, a light image can include a dynamically changing graphical image. This can be used to simulate light that is reflected from changing surfaces, such as, for example, the light reflected from a rippling body of water. By dynamically changing the light image using a recorded or simulated image of such a body of water, the light source will essentially paint the scene with a rippling light. Taken a further step, the light image can include an animation, motion picture or similar video image that is projected, not unlike a movie projector, on to the various surfaces of the scene. Indeed, this can be used to model a movie projector, wherein 3D objects, such as man 208 can walk in front of the projected light image and have portions of the projected image fall on his body.

With regard to man 208 as depicted in depth image 220, the depth image 220 has been further processed in this example to include data relating to the depth of man 208. This can be accomplished, for example, by comparing previous frames and completing new transform calculations for pixels that have changed and that are in the depth image for the light source. Thus, for example, from the previous frame, man 208 may have moved slightly (e.g., in response to inputs from the user). A portion of the pixels are identified as having changed from the previous frame. The portion of the pixels that changed are then transformed and processed to generate new modified light depth data 228. In this manner, only those portions of the scene that change need to be reprocessed.

For the second light source, a depth image 222 and light image 226 are also provided. Depth image 222 demonstrates that the second light source is positioned facing wall 202D and casting light on a portion of floor 204 and wall 202D. Light image 226 is similar to light image 224. Note that depth image 222 does not include man 208 or any other moving 3D object at this time. Thus, depth image 222 need not be updated at this time.

The various images in FIG. 8C are processed in accordance with process 100. A light accumulation buffer and subsequent frame buffer are created by combining data from the image of room 200', and light images 224 and 226, in accordance with the data in depth images 220 and 222. The resulting frame buffer is that of FIG. 7A, which clearly shows that man 208 casts a single shadow 210 as a result of the first light. Additionally, the accumulated light on mirrored wall 202B and 202D are shown.

In accordance with still further embodiments of the present invention, if camera 14 is required to periodically change position with respect to scene 10, for example, during an interactive simulation, then process 120 is repeated as necessary to recalculate and update the applicable transform tables, or to generate different, additional transform tables, based on the new camera position. If the camera is continually moving with respect to scene 10, then rather than manipulating and accumulating light based on pixels, process 100 is adapted to manipulate groups of pixels and/or polygons. This allows for a more granular approach, in which a light image can be rendered for each polygon, and light accumulation buffers can be used to accumulate light intensities from the various light sources for each polygon, rather than for each screen pixel. As such, a plurality of light images can be precomputed, one for each of the polygons (or for groups of polygons), for each of the fixed lights.

Figure 9:
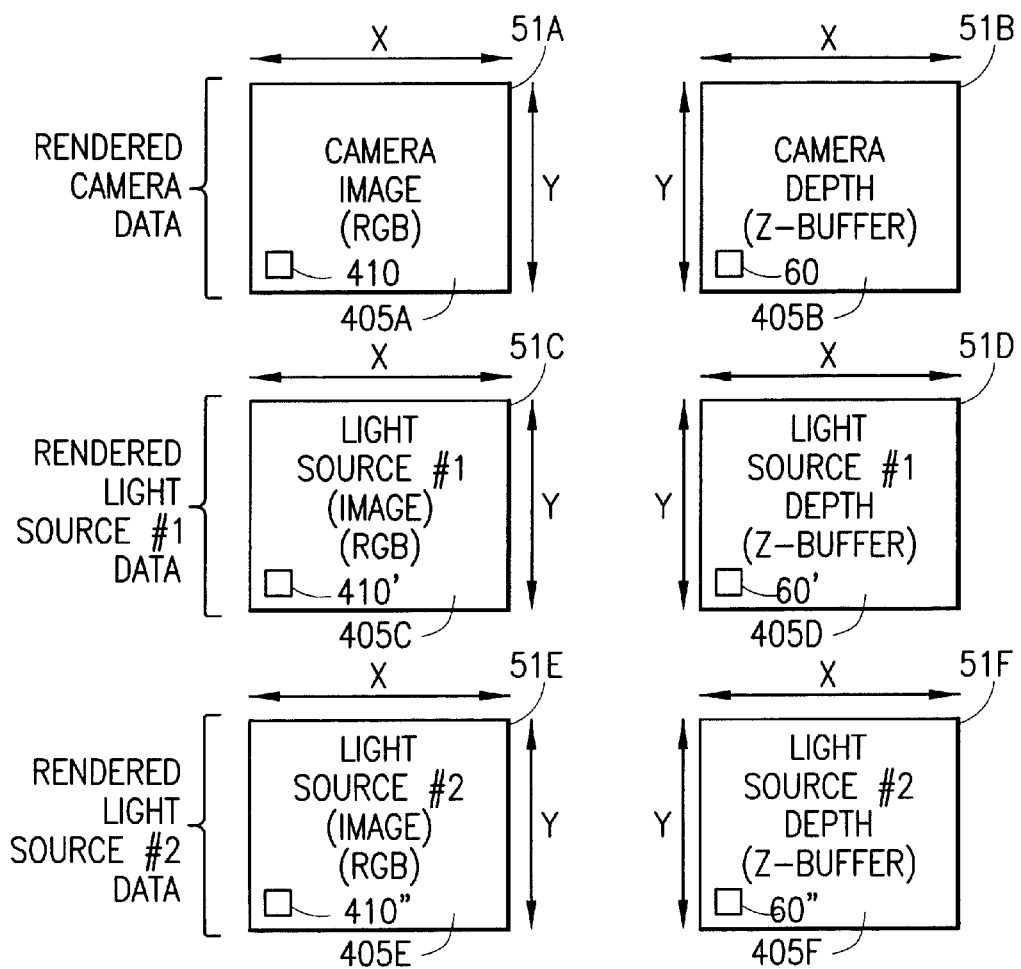
FIG. 9 is a block diagram depicting exemplary arrangements of modeling data as used to render shadows, for example, using the graphics card in FIG. 2A, in accordance with alternative embodiments of the present invention.
Figure 9:
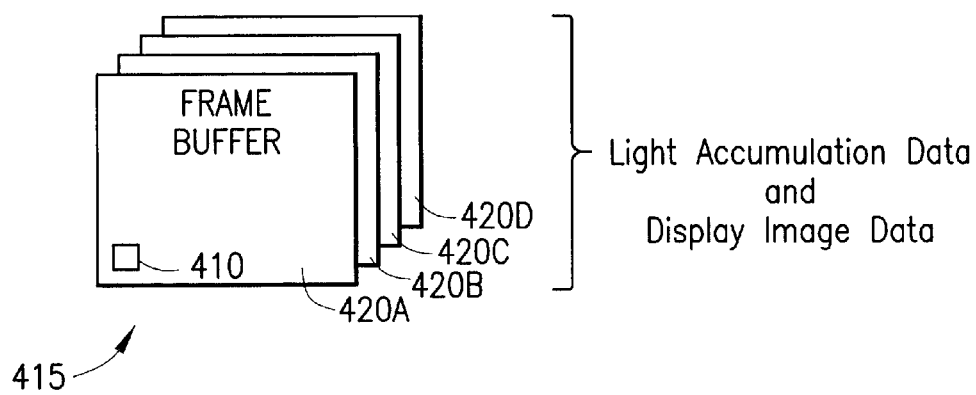

FIG. 9 is a block diagram depicting exemplary arrangements of modeling data as used to render lighting and shadows in accordance with an alternative embodiment of the present invention. For convenience, the various rendering data in FIG. 9 is illustrated as being logically stored in a plurality of matrices or databases 415 and 405A–G, each having an x axis and a y axis. Preferably, and in this example, the x and y axis correspond to an exemplary output device 56 having a screen that displays x by y numbers of pixels when provided corresponding red-green-blue (RGB) pixel data values. Those skilled in the art will recognize that other conventions and/or arrangements can also be used for storing and manipulating the data. For camera 13, a camera and image 405A is rendered at scene 10. Camera image 405A includes RGB pixel data values from scene 10 for x by y number of pixels (or pixel groups). An exemplary pixel having camera coordinates $S_P X$ and $S_P Y$ is depicted. Associated with camera image 405A is camera depth 405B. Camera depth 405B is a z buffer containing depth information for each of the x by y number of pixels in camera image 405A. The depth images are used during rendering to correctly determine the ordering of 3D objects within scene 10, from the camera's perspective. The use of z buffers is well known, for example, see Foley et al.

For light source #1, a light image 405C is rendered at scene 10. Light image 405C includes RGB pixel data values for light emitted for x by y number of pixels. For example, the data in light image 405C represents the intensity, color, and/or pattern of light emitted from light source #1. An exemplary pixel 410 is depicted following transformation of light source #1 coordinate $L_1 P_X$ and $L_1 P_Y$. Associated with light image source 405C is light depth 405D. Light depth 405D is a buffer containing depth information for each of the x by y number of pixels (or group of pixels) in light image 405C. The depth image is used during rendering to correctly determine the ordering of 3D objects within scene 10, from light source #1's perspective.

Light source #2 includes a light image 405E rendered of scene 10. Light image 405E includes RGB pixel data values for a light emitted, for X by Y number of pixels (or groups of pixels). For example, the data in light image 405E can represent the intensity, color and/or pattern of light emitted by light source #2. An exemplary pixel 410" which corresponds to pixel 410 in camera image 405A, is depicted following transformations at light source #2 coordinates $L_2 P_X$ and $L_2 P_Y$. Associated with light image 405E is light depth 405F. Light depth 405F is a Z buffer containing depth information for each of the X by Y numbers of pixels and light image 405E. The depth images used during rendering to correctly determine the ordering of 3D objects within scene 10, from light source #2's perspective.

Frame buffer 415 is also depicted as having pixel data values for X by Y number of pixels (or groups of pixels), as in camera image 405A and camera depth 405B. Frame buffer 415 may include a plurality of buffers 420 for storing various pixel data values for X by Y number of pixels. In one of the frame buffers 420A, RGB pixel data for the accumulated light falling on a pixel (or group of pixels) from light sources #1 and #2 are stored. As discussed below, by using a light accumulation data stored within the frame buffer 420A, a more realistic shadow rendering can occur, because pixels are accumulatively lighted, rather than accumulatively darkened as in past interactive real time shadow rendering algorithms.

Frame buffer 420B also stores RGB data of the final rendered 3D image of the scene 10. The data in frame buffer 420B is provided to output device 56 for display to the user. Those skilled in the arts will recognize that a plurality of frame buffers can be employed to allow for additional buffering of frames. It should be noted that first and second information tables for converting from camera coordinates to light source coordinates are not necessary in this implementation as transformations between coordinates may be formed by the vertex engine 310 and pixel engine 320 of FIG. 2A.

Figure 10:
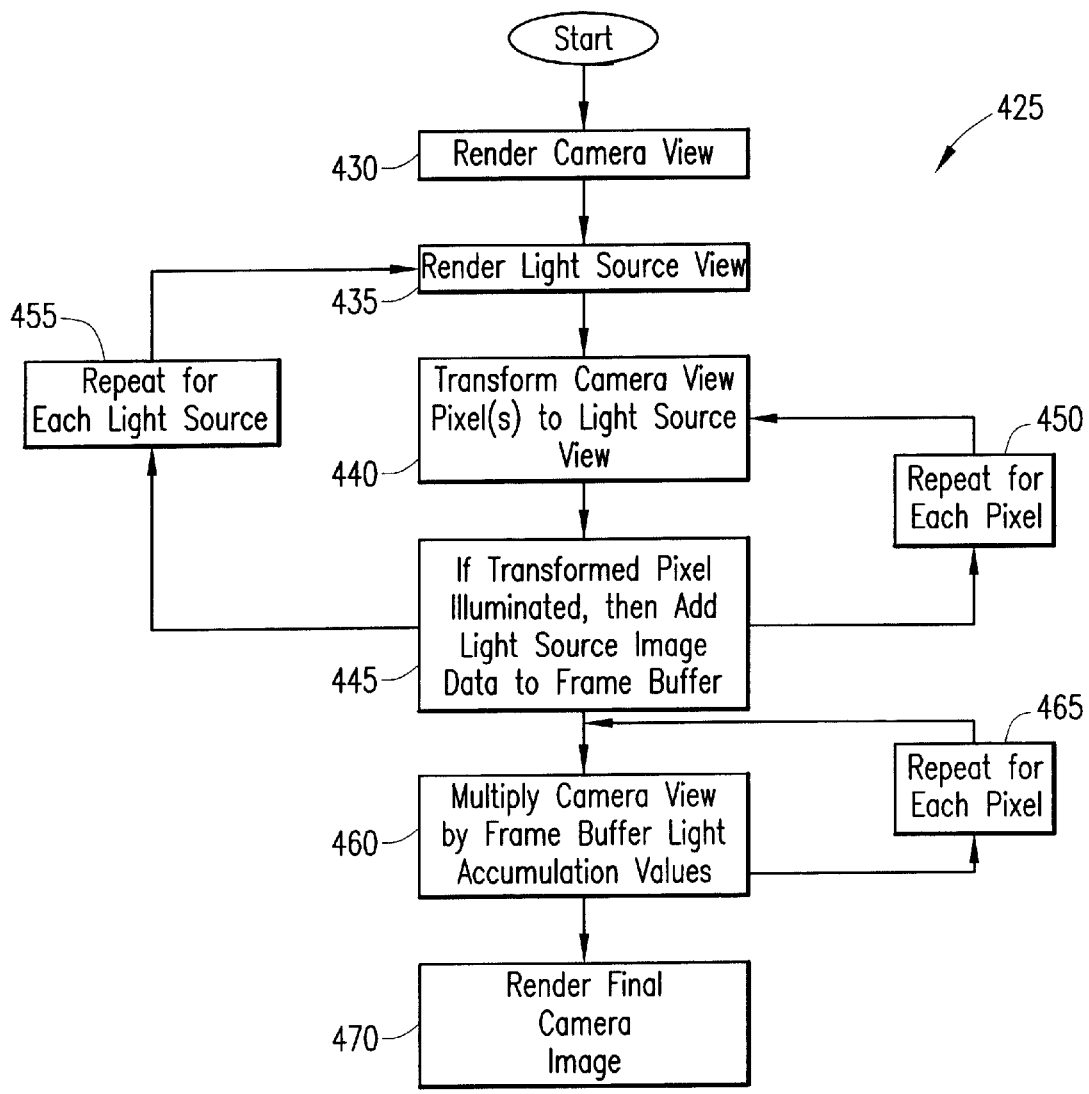
FIG. 10 is a exemplary flow chart depicting an alternative embodiment of an improved shadow rendering process, for use in a graphics card, for example, as in FIG. 2A in accordance with an alternative embodiment of the present invention.

Reference is now made to FIG. 10, which presents an exemplary flowchart for improved shadow rendering process 425, in accordance with certain embodiments of the present invention. Process 425 can be implemented, for example, in the graphics device 300 to render lighting and shadows for scene 10. In step 430, the camera's view is rendered using conventional methods, thereby producing camera image 405A and camera depth 405B. In step 435, the view from the light source is rendered. For example, in step 435, rendering the view from light source #1 produces light #1 image 405C and light #1 depth 405D.

Next in step 440, a pixel in camera image 405A is transformed or otherwise used to determine a corresponding pixel in light #1 image 405C and light #1 depth 405D. The transformation calculations needed to move between coordinates in step 440 are calculated by the pixel engine 320.

In step 445, if the transformed pixel identified in step 440 is illuminated by the light source, then the corresponding pixel data value and the light image is added to the frame buffer 420A. For example, considering pixel 410' from the Z value associated with 410' (as identified in light #1, depth 405D) it can be determined if pixel 410 is lighted by, or shaded from, light source #1. If pixel 410' is lighted, then the corresponding (RGB) pixel data value from light #1 image 405C is added to the frame buffer 420A. If pixel 410 is not lighted, (i.e., is shaded) then no change is made to the light accumulation data in frame buffer 420A.

Steps 440 and 445 are repeated for each of the pixels in the camera image 405A, as depicted by the iteration provided by step 450. After all the pixels in camera image 405A have been processed in steps 440–450, then according to step 455, the process is repeated for each additional light source. Step 455 leads back to step 435, wherein the next light source view is rendered. For example, step 435 can be repeated again for the light source #2 (or #N light sources). This iterative process allows for each of the pixel data values within the frame buffer 420A to be incrementally increased in a manner that matches accumulative light cast by the multiple light sources on each pixel.

After each of the light sources has been processed in accordance with steps 435 through 445, then in step 460, the pixel data value from the camera image 405A is multiplied by the corresponding pixel data value from the frame buffer 420A and the results are stored in frame buffer 420B. Step 460 is repeated for each of the pixels in camera image 51A, as depicted by iterative step 465. Then, in step 470, a resulting camera image is rendered in accordance with other processes, as needed and eventually stored in frame buffer 420C and displayed as a frame of data. It should be noted, that the step illustrated with respect to step 460 may rather than storing the image in frame buffer 420B, store the image in camera image 405A.

Figure 11:
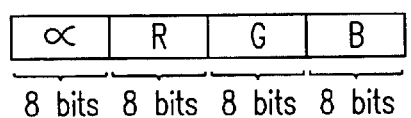
FIG. 11 is an exemplary entry of depth and image data, for use in a graphics module, for example, as in FIG. 2B, in accordance with an alternative embodiment of the present invention.

In yet a further alternative embodiment, other computer systems may not include a pixel engine similar to that disclosed in FIG. 2A and instead may comprise a system as that described in FIG. 2B. This system, rather than separately storing the depth data in a separate Z buffer, stores the information as an alpha value along with the RGB image data. This is illustrated in FIG. 11 where there is shown an entry for a pixel value in a storage table of a system such as that in FIG. 2B. By way of example, the 32 bit entry is separated into 8 bits for each value as follows: 8 bits for the alpha depth value and 8 bits each for the red, green and blue color values.

Figure 12:
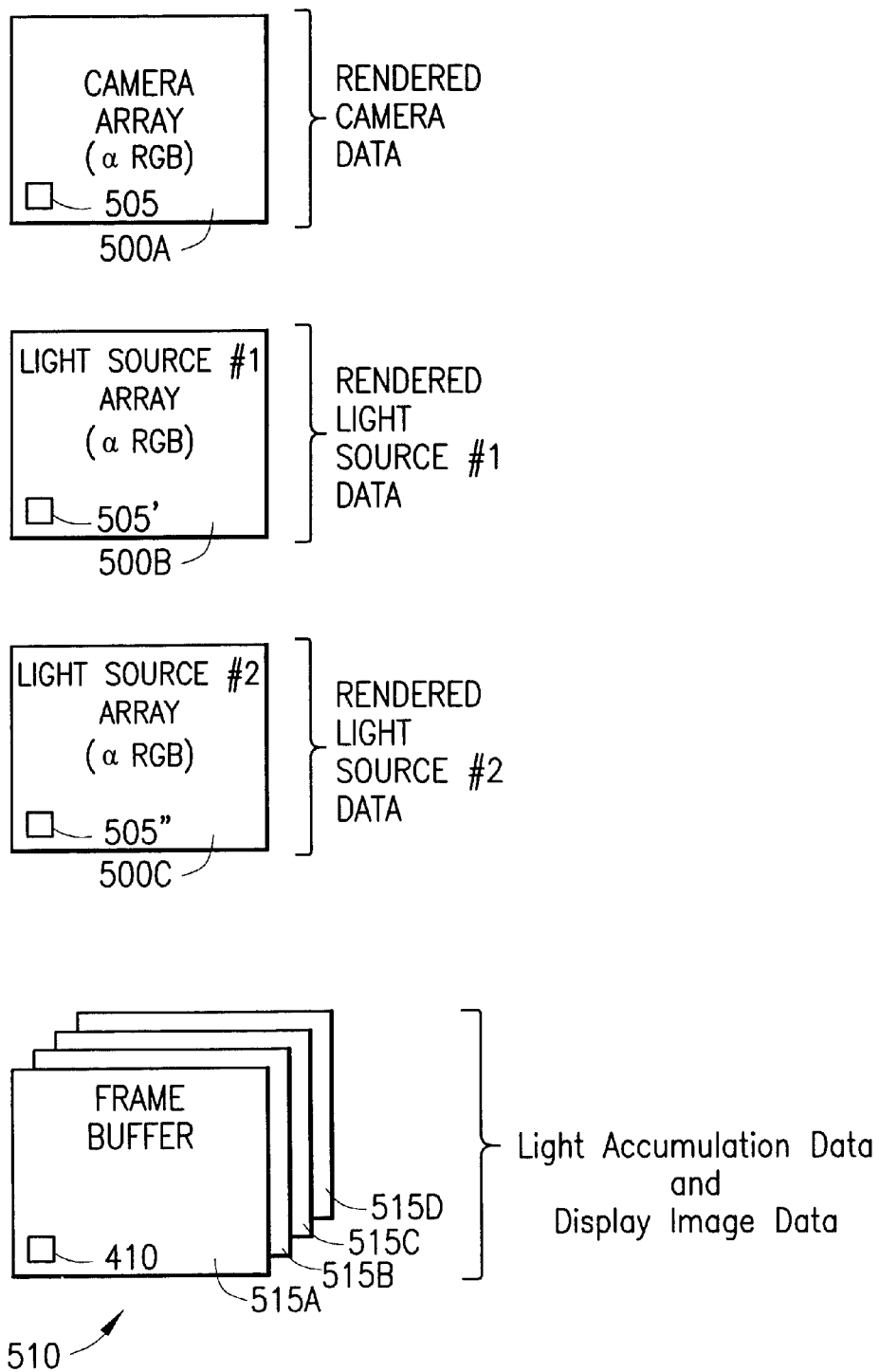
FIG. 12 is a block diagram depicting exemplary arrangements of modeling data as used to render shadows, for example, using the graphics module in FIG. 2B in accordance with alternative embodiments of the present invention.

Referring now more particularly to FIG. 12, there is a block diagram depicting an exemplary arrangement of modeling data as used to render lighting and shadows in accordance with a system using a graphics device 300 as illustrated in FIG. 2B. For convenience, the various entered data in FIG. 12 is illustrated as being logically stored in a plurality of 2D matrices or databases 500, each having an X and a Y axis. Preferably, and in this example, the X and Y axis corresponds to an exemplary output device having a screen that displays X by Y number of pixels when provided corresponding red, blue, green (RGB) and alpha pixel data values. Those skilled in the art will recognize that other data conventions and/or arrangements can be used for storing and manipulating the data.

For camera 14, a camera image 500A is rendered as a scene 10. Camera image 500A includes alpha and RGB pixel data values from scene 10 for X by Y number of pixels (or pixel groups). An exemplary pixel 505 having camera coordinates SPX and SPY is depicted. Associated with camera image 500A is camera depth value alpha stored with each RGB pixel values. Camera depth alpha contains depth information for each of the X by Y number of pixels in camera image 500A. The depth data is used during rendering to correctly determine the ordering of 3D objects within scene 10, from the camera's perspective.

For light #1, a light image 500B is rendered of scene 10. Light image 500B includes alpha and RGB pixel data values for the light emitted, for X by Y number of pixels. For example, the data in light image 500B can represent the intensity, color and/or pattern of light emitted by light source #1. An exemplary pixel 505', which corresponds to the pixel 505 in camera image 500A, is depicted following transformation as having light source #1 coordinates $L_1P_X$ and $L_1P_Y$. Associated with the RGB data values are alpha values representing depth for each of the X by Y pixels (or group of pixels) in light image 500B. The alpha depth data is used during rendering to correctly determine the ordering of 3D objects within scene 10, from light source #1's perspective.

Similarly, for light source #2, light image 500C is rendered of scene 10. Light image 500C includes alpha and RGB pixel data values for the light emitted, for X by Y number of pixels. For example, the data in light image 500C can represent the intensity, color, and/or pattern of light emitted by light source #2. An exemplary pixel 505", which corresponds to pixel 505, camera image 500A is depicted following transformation as having light source #2 coordinates $L_2P_X$ and $L_2P_Y$. Associated with the RGB data values are light depth information values alpha. Light depth information alpha is a data value containing depth information for each of the X by Y number of pixels in light image 500C. The depth values are used during rendering to correctly determine the ordering of 3D objects within scene 10, from light source #2's perspective.

Frame buffer 510 is also depicted as having pixel data values for x by Y number of pixels (or group of pixels) as in camera image 500A. Frame buffer 510 also will include a number of separate buffers for storing various light an/or camera images. Frame buffer 515A includes RGB pixel data from the accumulated light falling on a pixel (or group of pixels) for light sources #1 and #2. As discussed below, by using light accumulation data stored within the frame buffer 515A, a more realistic shadow rendering can occur, because pixels are accumulatively lighted, rather than accumulatively darkened as in past interactive real time shadow rendering algorithms. The light accumulation values also have alpha depth values associated therewith.

Frame buffer 515B includes pixel data values for X by Y number of pixels as in image 500A. Frame buffer 515B includes RGB data of the final rendered 3D image of scene 10. The data in frame buffer is provided to output device 56 for display to the user. Those skilled in the art will recognize that a plurality of frame buffers can be employed to allow for additional buffering of frames.

Figure 13:
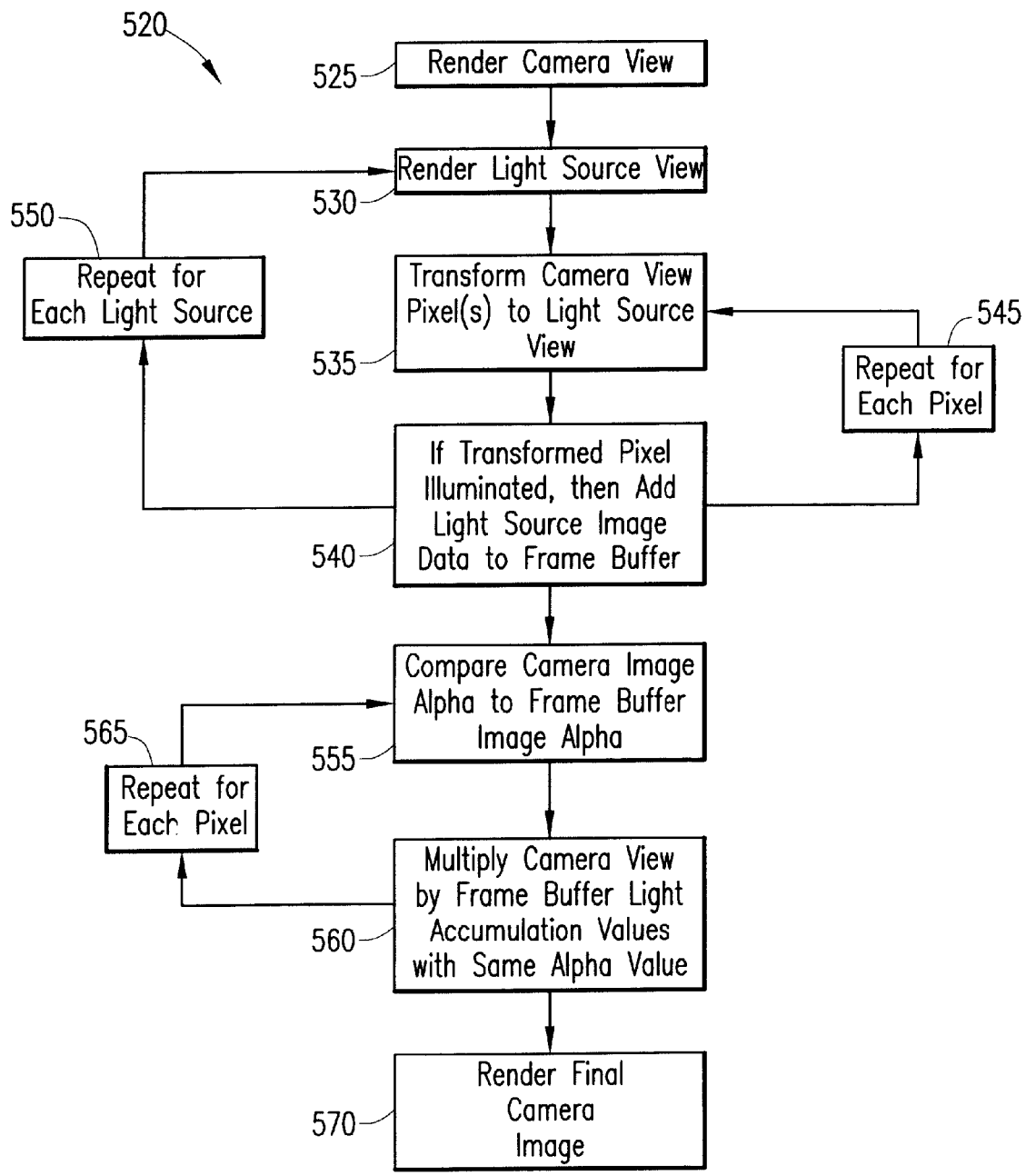
FIG. 13, is an exemplary flowchart depicting an improved shadowing ordering process, for use in the graphics module, for example, as in FIG. 2B in accordance with certain alternative embodiments of the present invention.

Reference is now made to FIG. 13, which depicts an exemplary flowchart for an improved shadow rendering process 520, in accordance with the alternative embodiment of the present invention described with respect to FIG. 12. Process 520 can be implemented, for example, in a graphic device 300 to render lighting and shadows for scene 10. In step 525, the camera's view is rendered using conventional methods, thereby producing camera image 500A including camera depth data alpha. In step 530, the view from the light source is rendered. For example, in step 530, rendering the view from light source #1 produces light #1 image 500B and light #1 depth data alpha. Next, in step 535, a pixel in camera image 500A is transformed or is otherwise used to determine a corresponding pixel 60' in light image #1 image 500B and light #1 depth value alpha. The transformation calculations needed to move between coordinates in step 535 are calculated by the main processing unit 330 of FIG. 2B.

In step 540, if the transformed pixel identified in step 535 is illuminated by the light source, the corresponding pixel data value in the light image is added to the frame buffer 515A. For example, considering pixel 505' from the alpha value associated with pixel 505' (as identified in light depth #1 alpha value) it can be determined if pixel 505' is lighted by, or shaded from light source #1. If pixel 505' is lighted, then the corresponding RGB pixel data value from light #1 image 501B is added to frame buffer 515A. If pixel 505' is not lighted (i.e., is shaded) then no change is made to frame buffer 515A.

Steps 535 and 540 are repeated for each of the pixels in camera image 500A as depicted by the iteration provided by step 545. After all the pixels in camera image 500A have been processed in steps 535–545, then, according to step 550, the process is repeated for each additional light source. Step 550 leads back to step 530, wherein the next light source view is rendered. For example, steps 530–545 can be rendered again for light source #2 (or #N light sources). This iterative process allows for each of the pixel data values within frame buffer 515A that is accumulating the light data to be incrementally increased in a manner that matches the cumulative light cast by the multiple light sources on each pixel.

After each of the light sources have been processed according to steps 530 through 550, then in step 555, a pixel data value from the camera image 500A is compared with the data in the frame buffer 515A to locate pixel data having a same alpha value. Once pixel data having a same alpha value is located, the located data value from the camera image 500A is multiplied at step 560 by the located accumulated light pixel data value from frame buffer 515A having a same alpha value and the results are stored in camera image 500A. Alternatively, the result can be stored in another buffer 515C located within frame buffer 510. Steps 555 and 560 are repeated for each of the pixels in camera image 500A, as depicted by iterative step 565. Then, in step 570, a resulting camera image is further rendered in accordance with other processes, as needed, and eventually stored in frame buffer 515B and displayed as a frame of data at display device 56.

By using the above described methods and storing light accumulation values in a frame buffer, memory use will be saved resulting in lower cost requirements for graphics systems.

Although several preferred embodiments of the methods and arrangements of the present invention have been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A shadow rendering method for use in a graphics device, the method comprising the steps of:

providing observer data of a simulated multi-dimensional scene to a first memory area of the graphics device;

providing lighting data associated with at least one simulated light source arranged to illuminate said scene to a second memory area of the graphics device;

for the at least one light source, comparing at least a portion of said observer data with at least a portion of said lighting data to determine if a modeled point within said scene is illuminated by said light source and storing at least a portion of said light image data associated with said point and said light source in a first portion of a frame buffer of the graphics device;

combining said light image data stored in said first portion of said frame buffer with said observer data and storing resulting image data in a second portion of said frame buffer; and outputting a resulting image data from said second portion of said frame buffer to a computer screen.

2. The method as recited in claim 1, wherein said observer data includes observed color data and observed depth data associated with a plurality of modeled polygons within said scene as rendered from an observer's perspective.

3. The method as recited in claim 2, wherein said lighting data includes source color data associated with at least one of said light sources and source depth data associated with said plurality of modeled polygons within said scene as rendered from a plurality of different light source's perspectives.

4. The method as recited in claim 3, wherein the step of comparing at least a portion of said observer data with at least a portion of said lighting data to determine if a modeled point within said scene is illuminated by said light source further includes comparing at least a portion of said observed depth data with at least a portion of said light source depth data to determine if said modeled point is illuminated by said light source.

5. The method as recited in claim 4, wherein the step of comparing at least a portion of said observed depth data with at least a portion of said light source depth data to determine if said modeled point is illuminated by said light source further includes converting at least a portion of said observed depth data from said observer's perspective to at least one of said plurality of different light source's perspectives, before comparing said observed depth data with said source depth data.

6. The method as recited in claim 3, wherein at least a portion of said source color data is selectively controlled source color data that can be changed over a period of time during which at least the step of displaying resulting image data to said computer screen is repeated a plurality of times.

7. The method as recited in claim 6, wherein said controlled source color data includes data selected from a set comprising motion picture data, video data, animation data, and computer graphics data.

8. The method as recited in claim 1, wherein the at least one simulated light source comprises a plurality of simulated light source.

9. The method as recited in claim 1, wherein the step of comparing at least a portion of said observer data with at least a portion of said lighting data to determine if a modeled point within said scene is illuminated by said light source further includes the step of comparing an alpha value associated with a portion of said observer depth data with an alpha value associated with a portion of said light source data to determine corresponding modeled points illuminated by said light source.

10. A graphics device configured to render shadows in a simulated multi-dimensional scene, the arrangement comprising:

an output to a display screen configured to display image data;

a memory for storing data including observer data associated with a simulated multi-dimensional scene, and lighting data associated with a plurality of simulated light sources arranged to illuminate said scene, said lighting data including light image data;

a frame buffer including a first storage area for light accumulation data and a second storage area for resulting image data; and at least one processor coupled to said memory and said frame buffer and operatively configured to, for each of said plurality of light sources, compare at least a portion of said observer data with at least a portion of said lighting data to determine if a modeled point within said scene is illuminated by said light source and storing at least a portion of said light image data associated with said point and said light source in the first storage area of the frame buffer, then combining at least a portion of said light image data with said observer data, and storing resulting image data in the second storage area of said frame buffer, and outputting at least a portion of said image data in said second storage area of said frame buffer to said display screen via said output.

11. The arrangement as recited in claim 10, wherein said observer data includes observed color data and observed depth data associated with a plurality of modeled polygons within said scene as rendered from an observer's perspective.

12. The arrangement as recited in claim 11, wherein the memory further includes a first array for storing the color data and a second array for storing the depth data.

13. The arrangement as recited in claim 11, wherein the memory further stores color data as red green blue values and depth data as an alpha value in a same entry of a single array.

14. The arrangement as recited in claim 10, wherein said processor is further configured to compare at least a portion of said observed depth data with at least a portion of said source depth data to determine if said modeled point is illuminated by said light source.

15. The arrangement as recited in claim 14, wherein said processor is further configured to convert at least a portion of said observed depth data from said observer's perspective to at least one of said plurality of different light source's perspectives, before comparing said observed depth data with said source depth data.

16. The arrangement as recited in claim 10, wherein said processor is further configured to selectively control at least a portion of said source color data over a period of time.

17. The arrangement as recited in claim 16, wherein said controlled source color data includes data selected from a set comprising motion picture data, video data, animation data, and computer graphics data.

18. The arrangement as recited in claim 10, wherein said processor is further configured to compare an alpha value associated with a portion of said observer data with an alpha value associated with a portion of said light source data to determine corresponding modeled points illuminated by said light source.

19. A shadow rendering method for use in a graphics device, the method comprising the steps of:

providing observer data of a simulated multi-dimensional scene;

providing lighting data associated with at least one simulated light source arranged to illuminate said scene;

for the at least one light source, comparing an alpha value associated with a portion of said observer depth data with an alpha value associated with a portion of said light source data to determine corresponding modeled points illuminated by said light source and comparing at least a portion of said observer data with at least a portion of said lighting data to determine if a modeled point within said scene is illuminated by said light source and storing at least a portion of said light image data associated with said point and said light source in a portion of a frame buffer;

combining at least a portion of said portion of said frame buffer with said observer data; and outputting a resulting image data to a computer screen.

20. An arrangement configured to render shadows in a simulated multi-dimensional scene, the arrangement comprising:

an output to a display screen configured to display image data;

a memory for storing data including observer data associated with a simulated multi-dimensional scene, and lighting data associated with a plurality of simulated light sources arranged to illuminate said scene, said lighting data including light image data;

a frame buffer including a first storage area for light accumulation data and a second storage area for resulting image data; and at least one processor coupled to said memory and said frame buffer and operatively configured to, for each of said plurality of light sources, compare an alpha value associated with a portion of said observer data with an alpha value associated with a portion of said light source data to determine corresponding modeled points illuminated by said light source, compare at least a portion of said observer data with at least a portion of said lighting data to determine if a modeled point within said scene is illuminated by said light source and storing at least a portion of said light image data associated with said point and said light source in the first storage area of the frame buffer, then combining at least a portion of said light image data with said observer data, and storing resulting image data in the second storage area of said frame buffer, and outputting at least a portion of said image data in said second storage area of said frame buffer to said display screen via said output.

* * * * *